(12) United States Patent
Gupta et al.

(10) Patent No.: US 8,523,735 B1
(45) Date of Patent: Sep. 3, 2013

(54) METHOD AND APPARATUS FOR EXECUTING A SHIFT IN A HYBRID TRANSMISSION

(75) Inventors: Pinaki Gupta, Wixom, MI (US); Lawrence A. Kaminsky, White Lake, MI (US); Besim Demirovic, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 13/402,946

(22) Filed: Feb. 23, 2012

(51) Int. Cl.
*B60K 1/02* (2006.01)
*G05G 3/00* (2006.01)

(52) U.S. Cl.
USPC .................................................. 477/3; 701/22

(58) Field of Classification Search
USPC ............................................................ 477/3
See application file for complete search history.

(56) References Cited

U.S. PATENT DOCUMENTS

| 7,522,981 B2* | 4/2009 | Kim et al. ........................ 701/36 |
| 8,433,486 B2* | 4/2013 | Heap et al. ...................... 701/54 |
| 2009/0118949 A1* | 5/2009 | Heap et al. ...................... 701/55 |

* cited by examiner

*Primary Examiner* — Dirk Wright

(57) ABSTRACT

A method for executing a transmission shift in a hybrid transmission including first and second electric machines includes executing a shift-through-neutral sequence from an initial transmission state to a target transmission state including executing an intermediate shift to neutral. Upon detecting a change in an output torque request while executing the shift-through-neutral sequence, possible recovery shift paths are identified. Available ones of the possible recovery shift paths are identified and a shift cost for each said available recovery shift path is evaluated. The available recovery shift path having a minimum shift cost is selected as a preferred recovery shift path and is executed to achieve a non-neutral transmission state.

10 Claims, 4 Drawing Sheets

METHOD AND APPARATUS FOR EXECUTING A SHIFT IN A HYBRID TRANSMISSION

GOVERNMENT CONTRACT RIGHTS

This invention was made with U.S. Government support under Agreement No. DE-FC26-08NT04386, awarded by the U.S. Department of Energy The U.S. Government may have certain rights in this invention.

TECHNICAL FIELD

This disclosure pertains to control systems for hybrid transmissions, including shift execution.

BACKGROUND

The statements in this section merely provide background information related to the present disclosure. Accordingly, such statements are not intended to constitute an admission of prior art.

Hybrid powertrain architectures can include multiple torque-generative devices, including internal combustion engines and non-combustion torque machines, e.g., electric machines, which transmit torque through a transmission device to an output member. Known hybrid powertrain systems may be configured to operate in continuously variable states and fixed-gear states, one embodiment of which includes a two-mode, compound-split, electro-mechanical hybrid transmission. In one embodiment, such a hybrid transmission includes an input member for receiving tractive torque from a prime mover power source, preferably an internal combustion engine, and an output member. The output member can be operatively connected to a driveline for a motor vehicle for transmitting tractive torque thereto. Torque machines, operative as motors or generators, can generate torque inputs to the hybrid transmission independently of a torque input from the internal combustion engine. The torque machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

Hybrid transmissions configured to operate in multiple continuously variable states execute shifts therebetween. Shifts between continuously variable modes may be commanded and executed independently of changes in operator torque demands. A shift between continuously variable states may be executed using an intermediate operation in neutral, referred to as a shift-through-neutral event.

SUMMARY

A method for executing a transmission shift in a hybrid transmission including first and second electric machines includes executing a shift-through-neutral sequence from an initial transmission state to a target transmission state including executing an intermediate shift to neutral. Upon detecting a change in an output torque request while executing the shift-through-neutral sequence, possible recovery shift paths are identified. Available ones of the possible recovery shift paths are identified and a shift cost for each said available recovery shift path is evaluated. The available recovery shift path having a minimum shift cost is selected as a preferred recovery shift path and is executed to achieve a non-neutral transmission state.

BRIEF DESCRIPTION OF THE DRAWINGS

One or more embodiments will now be described, by way of example, with reference to the accompanying drawings, in which.

DETAILED DESCRIPTION

Figure 1:
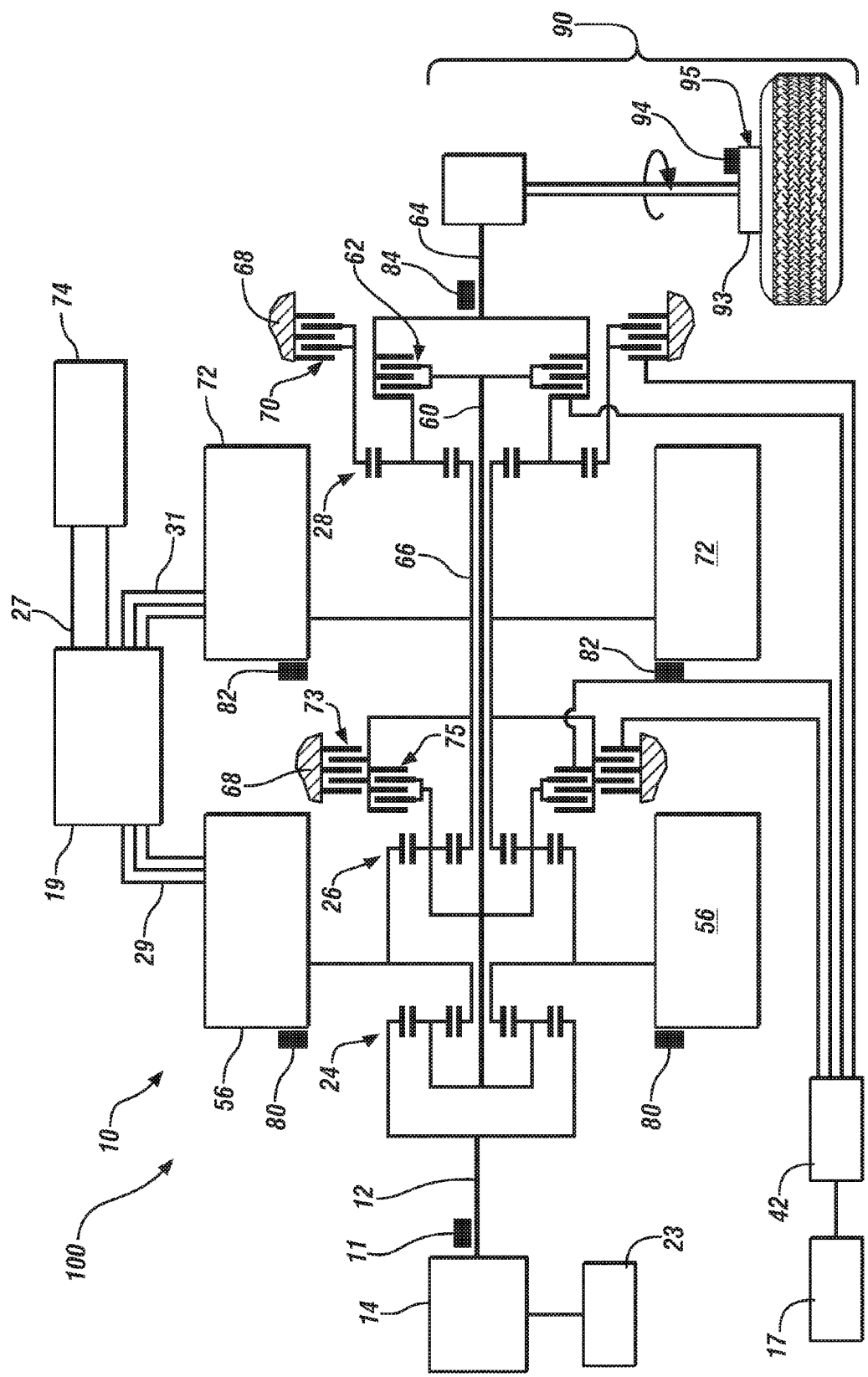
FIG. 1 illustrates an exemplary hybrid powertrain, in accordance with the present disclosure.

Referring now to the drawings, wherein the showings are for the purpose of illustrating certain exemplary embodiments only and not for the purpose of limiting the same, FIG. 1 depicts an electro-mechanical hybrid powertrain 100. The illustrated electro-mechanical hybrid powertrain 100 includes a two-mode, compound-split, electro-mechanical hybrid transmission 10 including first and second electric machines 56 and 72, respectively, and an internal combustion engine (engine) 14. The illustrated electro-mechanical hybrid powertrain 100 is a non-limiting embodiment of a hybrid powertrain system that is configured to operate in one of at least two continuously variable states.

The engine 14 and the first and second electric machines 56 and 72 each generate power in the form of torque which is transferred to the transmission 10. Power transfer from the engine 14 and the first and second electric machines 56 and 72 is described in terms of input torque, motor A torque, and motor B torque, respectively, and input speed, motor A speed, and motor B speed, respectively. Generated torque may be in the form of tractive torque or reactive torque. Tractive torque is positive torque that is generated to accelerate an output member 64 of the transmission 10, and hence accelerate a vehicle. Reactive torque is negative torque that is generated to decelerate the output member 64 of the transmission 10, and hence decelerate the vehicle.

The engine 14 preferably includes a multi-cylinder internal combustion engine selectively operative in several states to generate and transfer torque to the transmission 10 via an input member 12, and may be either a spark-ignition or a compression-ignition engine. The engine 14 includes a crankshaft coupled to the input member 12 of the transmission 10. A rotational speed sensor 11 monitors rotational speed of the input member 12. Power output from the engine 14 including rotational speed and engine torque may differ from the input speed and the input torque to the transmission 10 due to placement of torque-consuming components on the input member 12 between the engine 14 and the transmission 10, e.g., a hydraulic pump and/or a torque management device.

The transmission 10 in one embodiment includes three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Each of the resolvers 80 and 82 senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72.

The transmission 10 includes the output member 64, e.g., a shaft that is coupled to a driveline 90 for a vehicle to provide output power that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of the distributed controller system described with reference to FIG. 2 to determine vehicle speed, and absolute and relative wheel speeds for braking control, traction control, and vehicle acceleration management. Each of the vehicle wheels 93 is equipped with a friction brake 95 for applying friction braking torque.

The input torque, motor A torque and motor B torque are generated as a result of energy conversion from fuel or electrical potential stored in an electrical energy storage device (ESD) 74. The ESD 74 is high voltage DC-coupled to an inverter module (TPIM) 19 via DC transfer conductors 27. The TPIM 19 employs transfer conductors 29 to transfer electrical power to and from the first electric machine 56, and the TPIM 19 similarly employs transfer conductors 31 to transfer electrical power to and from the second electric machine 72 in response to commands for the motor A torque and the motor B torque. Electrical current is transmitted to and from the ESD 74 in accordance with whether the ESD 74 is being charged or discharged. The TPIM 19 includes power inverters and respective motor control modules configured to receive the torque commands and control inverter states in response to the commands for motor A torque and motor B torque. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies.

Figure 2:
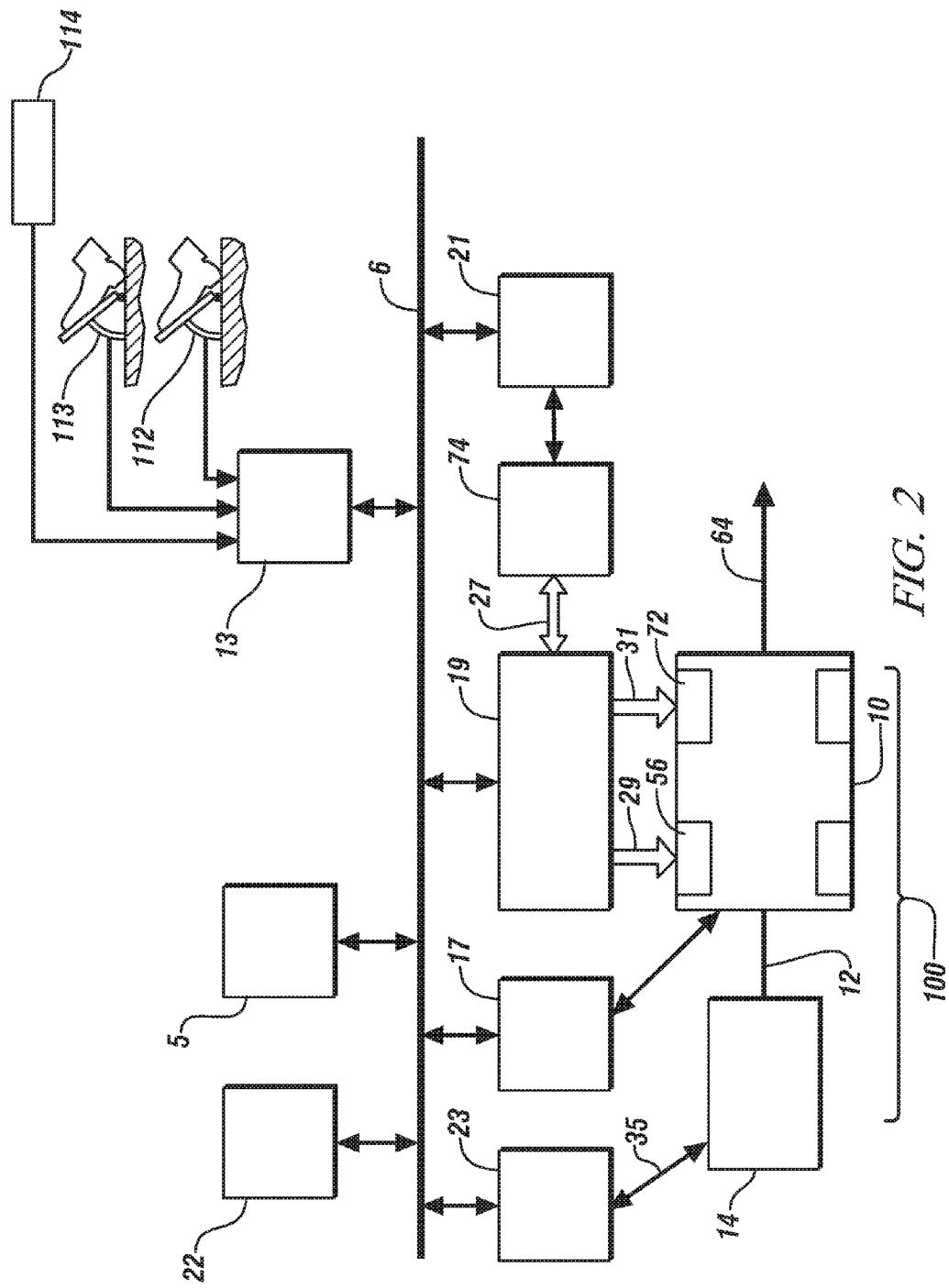
FIG. 2 illustrates an exemplary architecture for a controller system configured to control a hybrid powertrain, in accordance with the present disclosure.

FIG. 2 schematically shows an embodiment of a distributed controller system configured to control the hybrid powertrain 100 of FIG. 1. The elements described hereinafter include a subset of an overall vehicle control architecture, and provide coordinated system control of the hybrid powertrain 100 described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of operator input devices through which a vehicle operator generates an output torque request for controlling and directing operation of the hybrid powertrain 100. The operator input devices may include an accelerator pedal 113, an operator brake pedal 112, a transmission gear selector 114, e.g., a PRNDL selector, a vehicle speed cruise control, and other suitable devices for determining the output torque request. The transmission gear selector 114 may have a discrete number of operator-selectable positions, including the rotational direction of the output member 64 to enable one of a forward and a reverse direction of vehicle movement.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules may also be effected using a direct link, e.g., a serial peripheral interface (SPI) bus.

The HCP 5 provides supervisory control of the hybrid powertrain 100, serving to coordinate operation of the ECM 23, TCM 17, TPIM 19, and BPCM 21. Based upon various input signals from the user interface 13 and the hybrid powertrain 100, including the ESD 74, the HCP 5 determines an output torque request, an output torque command, an engine input torque command, clutch torque(s) for the applied torque-transfer clutches C1 70, C2 62, C3 73, C4 75 of the transmission 10, and motor A torque and motor B torque commands for the first and second electric machines 56 and 72.

The ECM 23 connects to the engine 14 to acquire data from sensors and control actuators of the engine 14 over a plurality of discrete lines. The ECM 23 receives the engine input torque command from the HCP 5. The ECM 23 determines the actual engine input torque provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed. The ECM 23 monitors inputs from sensors to determine states of other engine operating parameters including, e.g., a manifold pressure, engine coolant temperature, ambient air temperature, and ambient pressure. The engine load may be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules.

The TCM 17 operatively connects to the transmission 10 and monitors inputs from sensors to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic circuit 42 to selectively actuate the various clutches C1 70, C2 62, C3 73, and C4 75 to achieve various transmission states, as described hereinbelow.

The BPCM 21 signally connects to sensors to monitor the ESD 74 including states of electrical current and voltage parameters to provide information indicative of parametric states of the batteries of the ESD 74 to the HCP 5. The parametric states of the batteries preferably include battery state-of-charge, battery voltage, battery temperature, and available battery power.

A brake control module (BrCM) 22 operatively connects to the friction brakes 95 on each of the vehicle wheels 93. The BrCM 22 monitors the operator input to the brake pedal 112 and generates control signals to control the friction brakes 95 and sends a control signal to the HCP 5 to operate the first and second electric machines 56 and 72 based thereon, such as for energy capture by regenerative braking operation. This includes commanding a blended brake torque, which is a combination of the friction braking torque generated at the wheels 93 and the output torque generated at the output member 64 which reacts with the driveline 90 to decelerate the vehicle in response to the operator input to the brake pedal 112.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The hybrid powertrain 100 selectively operates in one of several propulsion states that may be described in terms of a combination of transmission states and engine states. The transmission states include a plurality of fixed-gear and continuously variable states and Neutral, and the engine states including one of an engine-on state (ON) and an engine-off state (OFF). The propulsion states are described with reference to Table 1, below.

TABLE 1

| Transmission State | Engine State | Applied Clutches | |
|---|---|---|---|
| EVT Mode 1 (M1) | ON or OFF | C1 70 | |
| G1 | ON | C1 70 | C4 75 |
| G2 | ON | C1 70 | C2 62 |
| EVT Mode 2 (M2) | ON or OFF | C2 62 | |
| G3 | ON | C2 62 | C4 75 |
| G4 | ON | C2 62 | C3 73 |
| Neutral (N) | ON or OFF | None | |

Table 1 indicates which of the clutches C1 70, C2 62, C3 73, and C4 75 are applied for each of the transmission states for the embodiment described herein. The continuously variable modes include a first electrically-variable transmission (EVT) mode (EVT Mode 1 or M1) and a second EVT mode (EVT Mode 2 or M2) in one embodiment. The fixed-gear modes include a fixed ratio operation of input-to-output speed of the transmission 10. The fixed-gear modes include first (G1), second (G2), third (G3), and fourth (G4) gears in one embodiment, with progressively decreasing gear ratios to achieve correspondingly increasing output speeds in relation to input speeds. The engine states include an engine-on state (ON) and an engine-off (OFF) state. The engine-on state includes a fuel cutoff mode (FCO) wherein the engine 14 is spinning but is unfueled. For purposes of this description, the engine input speed is equal to zero revolutions per minute (RPM) when the engine state is OFF, i.e., the engine crankshaft is not spinning. In EVT Mode 1 and EVT Mode 2, the engine state may be either ON or OFF.

In response to operator inputs via the accelerator pedal 113 and brake pedal 112 as captured by the user interface 13, the HCP 5 and one or more of the other control modules determine torque commands to control the torque actuators including the engine 14 and the first and second electric machines 56 and 72 to meet the output torque request at the output member 64 that is transferred to the driveline 90. Thus, the HCP 5 determines the output torque request, and generates commands for operating elements of the hybrid powertrain. Commands for operating elements of the hybrid powertrain 100 include a output torque command from the transmission 10 to the driveline 90 in response to the output torque request, an input torque from the engine 14, clutch torques for the torque-transfer clutches C1 70, C2 62, C3 73, C4 75 of the transmission 10, and the motor A torque and motor B torque commands for the first and second electric machines 56 and 72, respectively. Final vehicle acceleration may be affected by other factors including, e.g., road load, road grade, and vehicle mass. The propulsion states including the engine state and the transmission state are determined based upon operating parameters of the hybrid powertrain 100. This includes the output torque request communicated through the accelerator pedal 113 and brake pedal 112 to the user interface 13 as previously described. Selection of a preferred transmission state and a preferred engine state may be predicated on a torque demand caused by a command to operate the first and second electric machines 56 and 72 in an electrical energy generating mode or in a torque generating mode. Selection of the preferred transmission state and the preferred engine state may be determined by an optimization algorithm or routine which determines optimum system efficiency based upon operator demand for power, battery state of charge, and energy efficiencies of the engine 14 and the first and second electric machines 56 and 72. The control system controls the input torque, motor A torque, and motor B torque in response to an outcome of the executed optimization routine, and system efficiencies are optimized thereby to manage fuel economy and battery charging in response to the output torque request. Furthermore, operation may be determined based upon a fault in a component or system. The HCP 5 monitors the torque actuators and determines the power output from the transmission 10 at output member 64 that is required to achieve the output torque request while meeting other powertrain operating demands, e.g., charging the ESD 74. As is apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
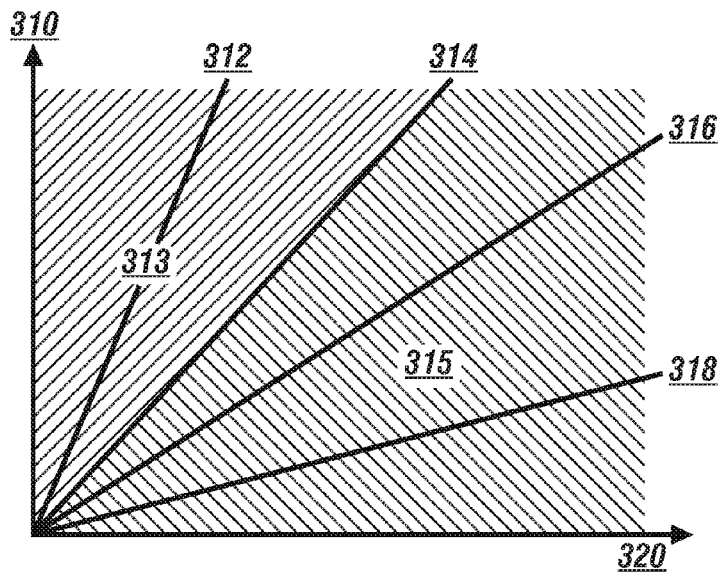
FIG. 3 illustrates transmission input speed plotted in relation to transmission output speed including data depicting transmission states for the hybrid powertrain shown in FIG. 1, in accordance with the disclosure.

FIG. 3 graphically shows transmission input speed (RPM) 310 plotted in relation to transmission output speed (RPM) 320, with data including relationships between the input speed 310 and the output speed 320 for the transmission states described in Table 1 for the hybrid powertrain system 100 shown in FIGS. 1 and 2. The fixed-gear states of G1 312, G2 314, G3 316, and G4 318 are depicted as individual lines. The continuously variable states of EVT Mode 1 313 and EVT Mode 2 315 are depicted as ranges of operation.

The electro-mechanical hybrid powertrain 100 may command a shift between an initial EVT mode and a final EVT mode. Operation in EVT Mode 1 is effected by applying only clutch C1 70 and operation in EVT Mode 2 is effected by applying only clutch C2 62. A known method of executing a shift between an initial EVT mode and a final EVT mode includes a synchronous mode-to-mode shift, which includes an intermediate operation in one of the fixed gear states, e.g., G2. Operation in the G2 fixed gear state includes simultaneous application of both clutch C1 70 and clutch C2 62. As is appreciated, a synchronous mode-to-mode shift including the fixed gear G2 may require a change in the input speed that is achieved by adjusting the engine speed. Adjusting the engine speed to effect intermediate operation in fixed gear G2 may result in unacceptable noise, vibration, and harshness (NVH) including, e.g., a commanded increase in the engine speed that is noticeable and unexpected by a vehicle operator. Adjusting the engine speed to effect intermediate operation in fixed gear G2 increase operating cost because fuel is consumed to increase the engine speed. The adjustments in the engine speed include increasing engine speed during a downshift and decreasing engine speed during an upshift. A preferred transmission state is selected in response to an output torque request and the capability of the hybrid powertrain 100 to meet that output torque request.

A shift from an initial EVT mode to a target EVT mode can include a synchronous mode-to-mode shift that includes an intermediate operation in Neutral, referred to as a mode-neutral-mode shift operation. The HCP 5 or another of the control modules may command execution of a mode-neutral-mode shift operation so long as suitable entrance criteria are met or otherwise satisfied. The mode-neutral-mode shift is executed without an intermediary step that includes operation in a fixed gear state, e.g., gear G2 in the hybrid powertrain system 100 described herein. Clutch deactivations and activations during the mode-neutral-mode shift are preferably executed synchronously. A mode-neutral-mode shift may be executed during a downshift event from EVT Mode 2 to EVT Mode 1 in response to an output torque request that is either a coastdown event, i.e., an operator has provided no input to either the accelerator pedal 113 or the brake pedal 112, or a braking event wherein an operator has commanded a net braking torque through the brake pedal 112. Other operating conditions may result in a command to execute a mode-neutral-mode shift, including conditions whereat a need or demand for propulsion is superseded by other factors including protecting of hardware, e.g., during an ABS maneuver or an engine start/flare, and when the demand for propulsion is minimal. An exemplary mode-neutral-mode shift operation is described in co-pending U.S. patent application Ser. No. 13/223,052, the contents of which are incorporated by reference in their entirety.

Figure 4:
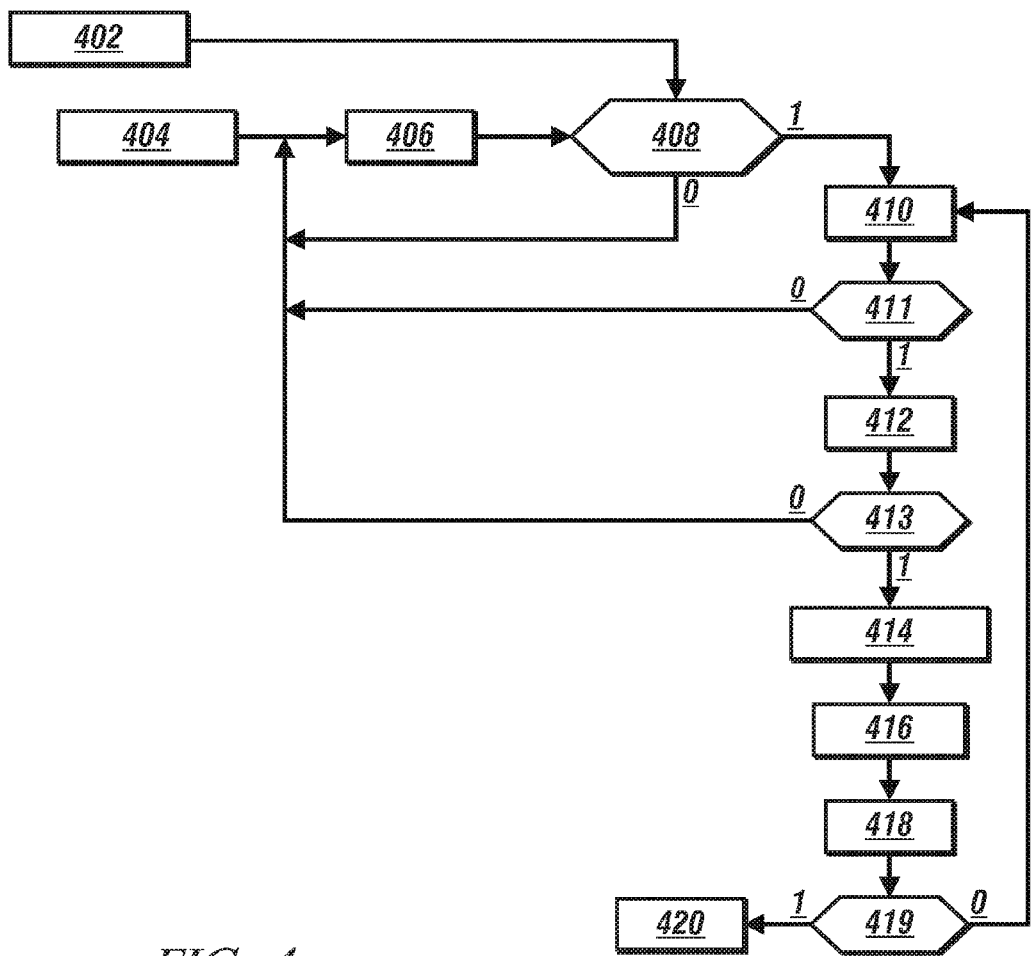
FIG. 4 illustrates a control scheme associated with executing a mode-neutral-mode shift operation from an initial EVT mode to a target EVT mode, wherein execution of the mode-neutral-mode shift is interrupted by a change in an output torque request, in accordance with the present disclosure.

FIG. 4 is a schematic flow diagram of a control scheme 400 associated with executing a mode-neutral-mode shift operation from an initial EVT mode to a target EVT mode, wherein execution of the mode-neutral-mode shift may be interrupted by a change in a demand for propulsion as indicated by an output torque request. The control scheme 400 is described with reference to operating an embodiment of the hybrid powertrain 100 described herein.

Flowchart 400 is iteratively executed as one or more algorithms in one of the control modules of the hybrid powertrain 100. Table 2 is provided as a key to FIG. 4 wherein the numerically labeled blocks and the corresponding functions are set forth as follows.

TABLE 2

| BLOCK | BLOCK CONTENTS |
|---|---|
| 402 | Monitor transmission state, output torque request, engine input speed, transmission operation |
| 404 | Command change in transmission state from initial EVT mode to target EVT mode |
| 406 | Execute mode-neutral-mode shift operation |
| 408 | Is there a significant change in the output torque request? |
| 410 | Identify all possible recovery shift paths to achieve a propulsion-capable state to regain output torque to recover vehicle propulsion in response to the change in the output torque request |
| 411 | Is alternate recovery shift path(s) identified? |
| 412 | Evaluate constraints associated with possible recovery shift path(s) |
| 413 | Unconstrained recovery shift path(s) identified? |
| 414 | Evaluate shift cost(s) of available recovery shift path(s) |
| 416 | Select preferred recovery shift path in relation to shift cost(s) |
| 418 | Execute preferred recovery shift path to achieve the selected propulsion-capable state |
| 419 | Is a propulsion-capable state achieved? |
| 420 | Stop executing algorithm and continue executing STN recovery path through propulsion-capable states |

Operation of the hybrid powertrain 100 including the transmission 10 is regularly and ongoingly monitored. Such monitoring includes quantifying states of parameters that include the propulsion state, i.e., the transmission state and the engine state, the output torque request, engine input speed, and other parameters associated with operating the engine and transmission (402). A change in transmission state from an initial EVT mode to a target EVT mode is commanded, with the command including a mode-neutral-mode shift operation. The mode-neutral-mode shift operation may be commanded in response to an output torque request that includes vehicle coasting operation or execution of antilock brake (ABS) operation, or another operation (404). By way of example the mode-neutral-mode shift operation may include executing a shift sequence from EVT Mode 2 to EVT Mode 1 with an intermediate period of operation in Neutral, also referred to as M2-N-M1 with M2 as the initial EVT mode and M1 as the target EVT mode. The engine may be in either the engine-on state or the engine-off state in the embodiment of the hybrid powertrain system 100 described herein. The mode-neutral-mode shift operation is executed (406).

During execution of the mode-neutral-mode shift operation, the output torque request is ongoingly monitored to determine whether there is a significant change in the output torque request (408). Preferably, the mode-neutral-mode shift operation is executed to completion, which occurs so long as there is no significant change in the output torque request (0). However, when there is a significant change in the output torque request (408)(1), the control scheme 400 evaluates operation to determine whether the control system should abort execution of the present mode-neutral-mode shift operation and/or whether the control system should change the target EVT mode. A significant change in the output torque request is a change in the output torque request that requires an immediate change in the output torque from the hybrid powertrain system 100. One example of a significant change in the output torque request is a tip-in event wherein the output torque request changes from a low or no operator input to the accelerator pedal to an output torque request that is substantial, e.g., greater than 25%. The operating system may be presently operating in neutral, and the change in the output torque request, e.g., a tip-in event, may result in a delayed response including an extended delay in a change in the output torque that may be unacceptable to an operator. This is referred to as a "dead pedal" event, and subsequent execution of the control scheme 400 operates to avoid or minimize such effects.

When there is a significant change in the output torque request (408)(1), possible shift paths for recovering propulsion are identified (410), including determining whether any alternative shift paths are identified (411). When alternative shift paths are identified (411)(1), the control scheme 400 determines whether execution of the mode-neutral-mode shift operation should be aborted with an associated change in the target EVT mode. When no alternative shift paths are identified (411)(0), the mode-neutral-mode shift operation continues executing to achieve the original target EVT mode (406). By way of example, one mode-neutral-mode shift operation may include a shift sequence of M2-N-M1. The control scheme 400 identifies all possible recovery shift paths to a propulsion-capable state to regain output torque to recover vehicle propulsion in response to the change in the output torque request. The propulsion-capable states may include any of the propulsion states described with reference to Table 1 for an embodiment of the exemplary hybrid powertrain system 100 described herein. By way of example, executing a mode-neutral-mode shift operation from EVT Mode 2 to EVT Mode 1 may include a first possible recovery shift path and a second possible recovery shift path. The first possible recovery shift path includes initially operating in EVT Mode 1 by activating clutch C1 70. Thus, EVT Mode 1 becomes the updated target EVT mode, and the shift sequence appears as follows: M2-N-M1. The second possible recovery shift path includes initially operating in EVT Mode 2 by activating clutch C2 62. Thus, EVT Mode 2 becomes the updated target EVT mode, and the shift sequence appears as follows: M2-N-M2. The second possible recovery shift path may include a final EVT mode of EVT Mode 1, with a further sequential process of initially activating clutch C2 62 to operate in EVT Mode 2, and then shifting to operating in fixed gear G2 by activating clutch C1 70, and then shifting to operating in EVT Mode 1 by deactivating clutch C2 62. The shift sequence for the second possible recovery shift path with a final EVT mode of EVT Mode 1 thus appears as follows: M2-N-M2-G2-M1.

Constraints associated with the possible recovery shift paths are evaluated to determine whether any of the possible recovery shift paths are prohibited or limited by either soft constraints or hard constraints. Available recovery shift path (s), if any, are identified (412). The constraints associated with the possible recovery shift paths include soft constraints and hard constraints. Soft constraints include constraints associated with actuator limits including, e.g., minimum and maximum input torques, minimum and maximum motor A torques and motor B torques, minimum and maximum clutch reactive torque(s) for the applied torque-transfer clutches, and battery power limits, e.g., minimum and maximum battery states-of-charge and available battery power. Hard constraints include constraints associated with faults, e.g., clutch faults. Any of the possible recovery shift paths that are prohibited by either the soft constraints or the hard constraints are precluded from further evaluation.

The constraints are used to determine whether any of the possible recovery shift path(s) are available (413)(1), or alternatively, whether all of the possible recovery shift path(s) are prohibited (413)(0). When all of the possible recovery shift path(s) are prohibited (413)(0), the present mode-neutral-mode shift operation is resumed (406). In the example above, the resumed shift sequence continues to be M2-N-M1. When alternative possible recovery shift path(s) are deemed available (413)(1), each of the available possible recovery shift path(s) is evaluated to determine shift costs (414).

Shift costs are used to quantify costs to determine which of the propulsion-capable states is most readily activatable. The shift costs are associated with changes in clutch speeds and clutch states required to effect the available possible recovery shift path by activating associated clutch(es), and costs associated with a loss of output torque while effecting operation in one of the propulsion-capable states. Each shift cost determination includes costs associated with synchronizing clutch speed(s) and costs associated with hydraulic state change(s) to activate oncoming clutch(es). The clutch speed(s) are synchronized to activate oncoming clutch(es) to effect operation in the target EVT mode. The hydraulic state change(s) include changes in the transmission hydraulic circuit to activate the oncoming clutch(es), including an analysis of a present state of clutch readiness. The shift cost(s) include shift costs associated with a change in clutch slip speed required to synchronize speeds of elements of the respective clutch associated with initially resuming operation in one of EVT Mode 1 and EVT Mode 2, and shift costs associated with effecting clutch readiness of the respective clutch associated with activating the clutch to operate in one of EVT Mode 1 and EVT Mode 2. The clutch readiness is evaluated in terms of a hydraulic state of the clutch, i.e., whether a hydraulic circuit associated with activating the clutch has been pre-filled, filled, started a fill process, or exhausted. The shift cost may further include any loss in output torque occurring during a period in which operation is initially resumed in one of the propulsion-capable states, e.g., one of EVT Mode 1 and EVT Mode 2 in this embodiment. Alternatively, the shift cost(s) may include only shift costs associated with a change in clutch slip speed required to synchronize speeds of elements of the respective clutch associated with initially resuming operation in one of EVT Mode 1 and EVT Mode 2. The shift cost evaluations are intended to determine which of the propulsion-capable states is most readily activatable as indicated by costs associated with clutch speed synchronization and clutch readiness, and a loss of output torque caused by a delay in operating in one of the propulsion-capable states.

A shift cost evaluation is executed for each of the available possible recovery shift paths. In one example, the possible recovery shift path may include the present recovery shift path with the final EVT mode of EVT Mode 1 with the shift sequence of M2-N-M1, and a second possible recovery shift path with a final EVT mode of EVT Mode 1 with a shift sequence of M2-N-M2-G2-M1. Shift costs include costs associated with each clutch operation associated with change(s) in the transmission state including both clutch activation(s) and deactivation(s), with shift cost increasing with increasing quantity of clutch operations. Shift costs include costs associated with any required change in the engine state between the engine-on state and the engine-off state, including when the engine is intermittently or temporarily started and stopped to effect clutch speed synchronization. Shift costs may increase when the recovery shift path prohibits an engine stop/start operation if the present shift path is in the midst of an engine stop/start operation, as this is equivalent to continued operation in neutral. Shift costs are decreased if the closest mode requires a single clutch operation and the clutch slip speed is less than a calibratable slip threshold, e.g., less than 500 RPM for one of the possible recovery shift paths. Shift costs are decreased if the closest mode in the selected path is the final transmission state for the possible recovery shift path.

The one of the available possible recovery shift paths having a minimum shift cost to resume operation in a propulsion-capable state is selected as the preferred recovery shift path (416). When the shift costs of the available possible recovery shift paths are the same, then the present recovery shift path is selected as the preferred recovery shift path. The preferred recovery shift path is executed (418). When a propulsion-capable state is achieved (419)(1), the control scheme 400 discontinues execution and the preferred recovery shift path is executed through propulsion-capable states to achieve the selected propulsion-capable state, including achieving operation in the target EVT mode to recover vehicle propulsion in response to the change in the output torque request (420). When a propulsion-capable state is not achieved during the present iteration of the control scheme 400 (419)(0) possible shift paths for recovering propulsion are again identified (410) to determine whether any alternative shift paths are identified (411) during the next iteration.

Figure 5:
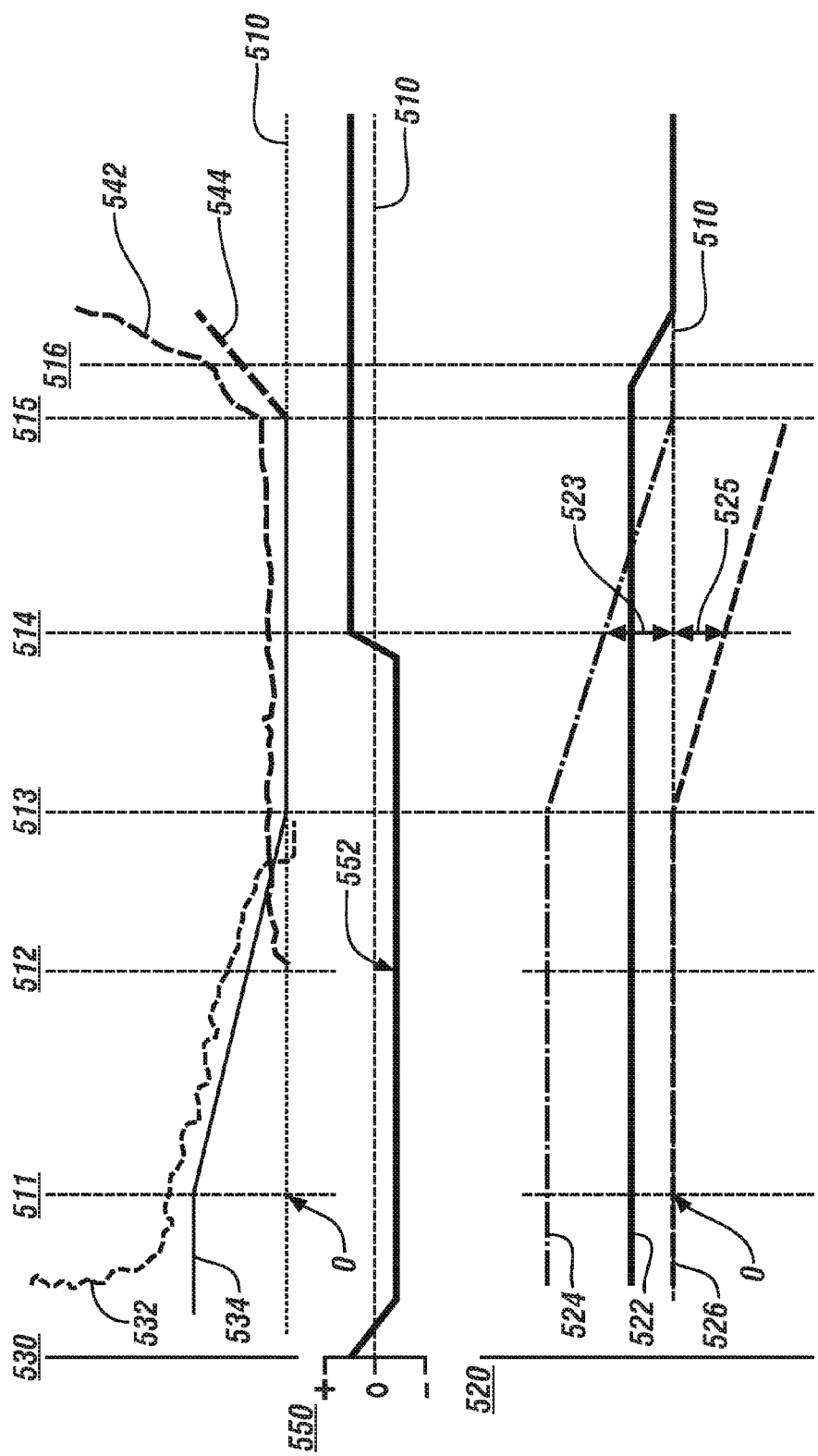
FIG. 5 illustrates time-coincident parameters related to operating the control scheme to execute a mode-neutral-mode shift from an initial EVT mode to a target EVT mode wherein execution of the mode-neutral-mode shift is interrupted by a change in an output torque request in accordance with the disclosure.

FIG. 5 graphically shows a plurality of time-coincident parameters associated with executing the control scheme 400 to effect a mode-neutral-mode shift from an initial EVT mode to a target EVT mode wherein execution of the mode-neutral-mode shift is interrupted by a change in an output torque request, described with reference to operating an embodiment of the hybrid powertrain 100. This execution of the mode-neutral-mode shift operation is described as a downshift event from an initial EVT mode, e.g., EVT Mode 2 to a target EVT mode, e.g., EVT Mode 1. The downshift event is executed in response to an output torque request that is either a coastdown event, i.e., an operator has provided no input to either the accelerator pedal 113 or the brake pedal 112, or a braking event wherein an operator has commanded a net braking torque through the brake pedal 112. Other operating conditions may also result in a command to execute a mode-neutral-mode shift operation.

The time-coincident parameters are plotted in relation to elapsed time 510 and include a speed scale (RPM) 520, a clutch torque scale (N-m) 530, and an output torque request scale (N-m) 550. Parameters shown on the speed scale (RPM) 520 include OG clutch speed 526, OC clutch speed 524, and engine input speed 522. The OG clutch speed 526 and the OC clutch speed 524 indicate relative speeds between clutch elements of the respective clutches, and thus a speed of 0 RPM indicates synchronized speed for the clutch elements of the respective one of the clutches. Parameters shown on the clutch torque scale 530 include an OG clutch torque pressure 532, an OG clutch capacity 534, an OC torque pressure 542, and an oncoming clutch torque capacity 544. The parameter shown on the output torque request scale 550 is the output torque request 552. As shown and described herein, clutch C2 70 is the off-going clutch and clutch C1 62 is the oncoming clutch with the hybrid powertrain 100 shifting from EVT Mode 2 to EVT Mode 1. Relevant time points include time points 511, 512, 513, 514, 515, and 516.

Prior to time point 511, OG clutch torque pressure 532 is reduced, approaching the OG clutch capacity 534, and shown in response to a reduction in the output torque request 552. At time point 511, a command to execute a mode-neutral-mode shift operation is initiated, which is a downshift event from EVT Mode 2 to EVT Mode 1 as shown. The continued reduction in the OG clutch torque pressure 532 reduces the OG clutch capacity 534, thus offloading torque capacity of the OG clutch. At time point 512, OC torque pressure 542 begins increasing as the OC clutch is prefilled in anticipation of being activated. At time point 513, the OG clutch is off-loaded, and thus the transmission is operating in neutral. This is indicated by a change in the OG clutch speed 526 to a non-zero point, indicating loss of synchronization. The first and second electric machines 56 and 72 are controlled to synchronize speeds of elements of the OC clutch.

Immediately prior to time point 514, an increase in the output torque request 552 interrupts execution of the mode-neutral-mode shift operation and results in a command to abort the execution of the mode-neutral-mode shift operation. In response to the command to abort, all possible recovery shift paths to achieve a propulsion-capable state to regain output torque to recover vehicle propulsion are identified. In one embodiment, the possible recovery shift paths include a first recovery shift path that includes immediately operating in EVT Mode 1 by activating clutch C1 70, and a second recovery shift path that includes a sequential process of immediately operating in EVT Mode 2 by activating clutch C2 62, shifting to fixed gear G2 by activating clutch C1 70, and then shifting to EVT Mode 1 by deactivating clutch C2 62. This includes an analysis to determine that both the first and second possible recovery shift paths are available recovery shift paths and are not prohibited.

The available recovery shift paths are evaluated to determine a nearest propulsion-capable state. This is depicted by a first clutch speed synchronization portion 523 of a first shift cost factor and a second clutch speed synchronization portion 525 of a second shift cost factor. The first clutch speed synchronization portion 523 includes a magnitude of change in speed required to synchronize the OC clutch as indicated by a difference between the OC clutch speed 524 and synchronized clutch speed, i.e., 0 RPM. The second clutch speed synchronization portion 525 includes a magnitude of change in speed required to synchronize the OG clutch as indicated by a difference between the OG clutch speed 526 and synchronized clutch speed, i.e., 0 RPM. The clutch accelerations, i.e., changes in the OG clutch speed 526 and OC clutch speed 524 are also taken into account, in addition to an evaluation of output torque carrying capacity of the respective clutches associated with resuming operation in one of EVT Mode 1 and EVT Mode 2 in terms of the clutch readiness, i.e., whether a hydraulic circuit associated with activating the clutch has been pre-filled, filled, started a fill process, or exhausted. Thus, the evaluation of the shift cost factors is intended to determine which of the available possible recovery shift paths is most readily activated as indicated by the clutch speed synchronization and the clutch readiness. Losses in output torque during the periods attaining the propulsion-capable state may also calculated for resuming operation in one of EVT Mode 1 and EVT Mode 2. The one of the available possible recovery shift paths having a minimum shift cost is selected as a preferred propulsion state. In this example, the OC clutch is identified as having a minimum shift cost. Thus, the preferred recovery shift path includes activating the OC clutch and operating in EVT Mode 1. The OC clutch is activated at time point 515 when the OC clutch speed 524 achieves zero RPM by increasing the OC torque hydraulic pressure 542, which has been prefilled during the previous period. The oncoming clutch torque capacity 544 thus increases to transfer torque while operating in EVT Mode 1, thus ending execution of the control scheme 400 associated with executing the mode-neutral-mode shift operation from the initial EVT mode to the target EVT mode which includes responding to a command to abort execution of the mode-neutral-mode shift.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for executing a transmission shift in a hybrid transmission including first and second electric machines, comprising:
    executing a shift-through-neutral sequence from an initial transmission state to a target transmission state including executing an intermediate shift to neutral;
    upon detecting a change in an output torque request while executing the shift-through-neutral sequence, identifying possible recovery shift paths;
    identifying available ones of the possible recovery shift paths;
    evaluating a shift cost for each said available recovery shift path;
    selecting as a preferred recovery shift path the available recovery shift path having a minimum shift cost; and
    executing the preferred recovery shift path to achieve a non-neutral transmission state.

2. The method of claim 1, wherein detecting the change in the output torque request comprises detecting a tip-in event in the output torque request.

3. The method of claim 1, wherein evaluating the shift cost for each said available recovery shift path comprises quantifying costs associated with clutch speed synchronization and costs associated with hydraulic state changes in hydraulic circuits to achieve clutch readiness in an oncoming clutch.

4. The method of claim 1, wherein executing the preferred recovery shift path comprises activating operation in a non-neutral transmission state employing the available recovery shift path having the minimum shift cost in response to the change in the output torque request.

5. Method for executing a transmission shift in a hybrid powertrain system including first and second electric machines, comprising:
    executing a shift-through-neutral sequence from an initial transmission state to a target transmission state including executing an intermediate shift to neutral;
    upon detecting a change in an output torque request, evaluating shift costs for available recovery shift paths;
    selecting as a preferred recovery shift path the available recovery shift path having a minimum shift cost; and
    executing the preferred recovery shift path to achieve a non-neutral transmission state.

6. The method of claim 5, further comprising evaluating possible recovery shift paths to identify the available recovery shift paths based upon system constraints.

7. The method of claim 5, wherein evaluating the shift costs for available recovery shift paths comprises quantifying costs associated with clutch speed synchronization and costs associated with hydraulic state changes in hydraulic circuits to achieve clutch readiness in an oncoming clutch.

8. The method of claim 5, wherein executing a shift-through-neutral sequence comprises executing a shift-through-neutral sequence from an initial continuously variable state to a target continuously variable state including executing the intermediate shift to neutral.

9. Method for operating a hybrid transmission, comprising:
    executing a multi-stage shift sequence to shift the transmission from an initial state to a target state including executing an intermediate shift to neutral;
    upon detecting a change in an output torque request during operating in neutral, identifying possible recovery shift paths to achieve a non-neutral state;
    determining shift costs for the possible recovery shift paths; and
    selecting and executing a preferred one of the recovery shift paths, the preferred recovery shift path comprising the possible recovery shift path having a minimum shift cost.

10. The method of claim 9, wherein determining shift costs for the possible recovery shift paths comprises quantifying costs associated with clutch speed synchronization and costs associated with hydraulic state changes in hydraulic circuits to achieve clutch readiness in an oncoming clutch.

* * * * *